United States Patent
Craig et al.

(10) Patent No.: US 11,730,304 B2
(45) Date of Patent: Aug. 22, 2023

(54) BREWER DEVICE WITH FRESHNESS MONITOR

(71) Applicant: BUNN-O-MATIC CORPORATION, Springfield, IL (US)

(72) Inventors: Joshua T. Craig, Springfield, IL (US); John E. Thing, Springfield, IL (US); Jacob P. Perry, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 311 days.

(21) Appl. No.: 17/008,922

(22) Filed: Sep. 1, 2020

(65) Prior Publication Data

US 2021/0076863 A1 Mar. 18, 2021

Related U.S. Application Data

(60) Provisional application No. 62/900,963, filed on Sep. 16, 2019.

(51) Int. Cl.
*A47J 31/00* (2006.01)
*A47J 31/52* (2006.01)
*G06F 3/0482* (2013.01)

(52) U.S. Cl.
CPC ........... *A47J 31/002* (2013.01); *A47J 31/525* (2018.08); *G06F 3/0482* (2013.01)

(58) Field of Classification Search
CPC ........ A47J 31/002; A47J 31/525; G06F 3/482
See application file for complete search history.

(56) References Cited

U.S. PATENT DOCUMENTS

| 5,229,751 | A  | * | 7/1993  | Chandler   | A47J 31/56    |
|           |    |   |         |            | 73/304 R      |
| 5,956,151 | A  | * | 9/1999  | Zajac      | A47J 31/52    |
|           |    |   |         |            | 356/436       |
| 6,228,410 | B1 | * | 5/2001  | Zajac      | G01N 21/534   |
|           |    |   |         |            | 426/594       |
| 2005/0105395 | A1 | * | 5/2005  | Harrison   | A47J 31/52    |
|           |    |   |         |            | 368/10        |
| 2005/0188856 | A1 | * | 9/2005  | Sumser     | A47J 31/5253  |
|           |    |   |         |            | 99/279        |
| 2011/0212231 | A1 | * | 9/2011  | McLaughlin | A47J 31/5253  |
|           |    |   |         |            | 99/289 R      |
| 2014/0332433 | A1 | * | 11/2014 | Lyall, III | A47J 41/0094  |
|           |    |   |         |            | 206/459.1     |
| 2016/0171256 | A1 |   | 6/2016  | Knepler    |               |
| 2017/0046903 | A1 |   | 2/2017  | Knepler et al. |           |

FOREIGN PATENT DOCUMENTS

CA 2584577 * 1/2012

* cited by examiner

*Primary Examiner* — Anthony J Weier
(74) *Attorney, Agent, or Firm* — Barnes & Thornburg LLP

(57) ABSTRACT

A brewer device with a brewer control system and a user interface is provided. The brewer control system is configured to dispense a brewed beverage and includes a freshness monitor to generate a freshness status of respective brewed beverages dispensed by the brewer control system into a plurality of servers. The user interface includes an output device to present the freshness status of the respective brewed beverages in the plurality of servers. The freshness monitor is local to the brewer control system without needing to establish communications with any of the plurality of servers.

20 Claims, 3 Drawing Sheets

BREWER DEVICE WITH FRESHNESS MONITOR

RELATED APPLICATIONS

This application claims the benefit of U.S. Provisional Application Ser. No. 62/900,963 filed Sep. 16, 2019, which is hereby incorporated by reference in its entirety.

BACKGROUND

The present disclosure relates to brewer devices for making brewed beverages, such as coffee, tea and the like. The brewer device produces a brewed beverage and dispenses it into a server, such as a carafe, coffee pot, tea pot, or the like. After being brewed, the brewed beverage will remain fresh for a period of time. At some point, the brewed beverage will no longer be fresh, and the taste profile will deteriorate. Once this happens, any remaining brewed beverage left in the server will need to be replaced with a fresh brew.

In some environments, the brewer device could dispense a brewed beverage into multiple servers, which are dispersed around an establishment, such as a restaurant. The freshness of the brewed beverages in these servers depends on, among other things, when the brewed beverage was brewed for each respective server. Accordingly, the timing in which a fresh brew is needed varies for each server depending on when the brewed beverage was initially brewed. Keeping track of which server needs a fresh brew can be difficult and time consuming. However, if a server is not replaced with a fresh brew in time, patrons that consume a brewed beverage after the taste profile has already deteriorated leads to a bad customer experience.

Some existing brewer devices include freshness monitors in which the brewer and/or servers include communication devices that allow communication between servers and brewer to monitor freshness. While this type of freshness monitor works for its intended purpose, there are potential downsides. For example, the specialized communication electronics increase the cost of the brewer and server and complexity of the brewing system. Additionally, the brewer and server must remain within a certain range for communications therebetween. Therefore, there is a need for a freshness monitor that overcomes these issues.

SUMMARY

According to one aspect, this disclosure provides a brewer device with a brewer control system and a user interface. The brewer control system is configured to dispense a brewed beverage and includes a freshness monitor to generate a freshness status of respective brewed beverages dispensed by the brewer control system into a plurality of servers. The user interface including an output device to present the freshness status of the respective brewed beverages in the plurality of servers. The freshness monitor is local to the brewer control system without establishing communications with any of the plurality of servers.

According to another aspect, this disclosure provides a brewer device with a processor and a non-transitory, computer-readable storage media. The processor is configured to control brewing of a brewed beverage. The non-transitory, computer-readable storage media comprises a plurality of instructions stored thereon that, in response to being executed, cause the processor to: establish a freshness status associated with a plurality of brewed beverages; monitor the freshness status associated with the plurality of servers with brewed beverages; generate an alert identifying a server of the plurality of servers in response to a determination that a brewed beverage in the server is no longer fresh. The determination that the brewed beverage in the server is no longer fresh is made locally by the processor without establishing communications with any of the plurality of servers.

According to a further aspect, this disclosure provides a brewer device including a server manager, a timer engine, and a freshness manager. The server manager is to receive and store a plurality of server names associated with the brewer device. The timer engine is to associate a timer for a predetermined time period with each server name of the plurality of server names. The timer engine starts the timer for a respective server name of the plurality of server names in response an input received on a user interface of the brewing device. The freshness manager is to provide an alert on the user interface upon the timer being less than a threshold time remaining. The alert identifies the server associated with the timer that is less than the threshold time remaining.

DETAILED DESCRIPTION OF THE DRAWINGS

Figure 1:
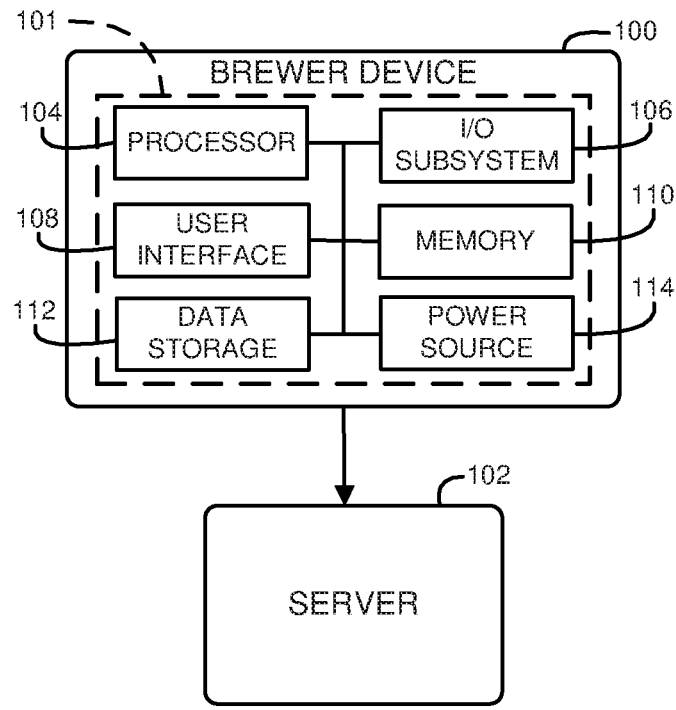
FIG. 1 is a simplified block diagram of at least one embodiment of a brewer device with freshness monitoring.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

There are elements of the brewer device that may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a brewer device 100 is configured to dispense a brewed beverage into a server 102, which by way of example, could be a carafe, coffee pot, tea kettle, or other vessel for holding the brewed beverage. The term "brewer device" is broadly intended to mean any device that could be used to produce a brewed beverage, such as coffee, tea, tisane, herbal teas, or other beverages. As described further below, the brewer device 100 includes a freshness monitoring feature that identifies which of a plurality of servers need a fresh brew. For example, the brewer device 100 could monitor the elapsed time since brewing the brewed beverage for each of the plurality of servers. When a predetermined time period after producing a brewed beverage has passed (or is about to pass) for a server, the brewer device 100 creates an alert that identifies which server from the plurality of servers needs a fresh brew. This feature allows operators of the brewer device 100 to identify which servers require a fresh brew (or will shortly). As shown in FIG. 1, the brewer device 100 has a brewer control system 101 that illustratively includes a processor 104, an input/output subsystem 106, a user interface 108, a memory 110, a data storage device 112, and a power source 114. Of course, the brewer control system 101 may include other or additional components in other embodiments. Additionally, in some embodiments, one or more of the illustrative components may be incorporated in, or otherwise form a portion of, another component. For example, the memory 110, or portions thereof, may be incorporated in the processor 104 in some embodiments.

The processor 104 may be embodied as any type of processor capable of performing the functions described herein. The processor 104 may be embodied as a single or multi-core processor(s), microcontroller, or other processor or processing/controlling circuit.

The memory 110 may be embodied as any type of volatile or non-volatile memory or data storage capable of performing the functions described herein. In operation, the memory 110 may store various data and software used during operation of the brewer device 100 such as applications, programs, recipes, and/or drivers. The memory 110 is communicatively coupled to the processor 104 via the I/O subsystem 106, which may be embodied as circuitry and/or components to facilitate input/output operations with the processor 104, the memory 110, and other components of the brewer device 100. In some embodiments, the I/O subsystem 106 may form a portion of a system-on-a-chip (SoC) and be incorporated, along with the processor 104, the memory 110, and other components of the brewer control system 101, on a single integrated circuit chip. Similarly, the data storage device 112 may be embodied as any type of device or devices configured for short-term or long-term storage of data such as, for example, memory devices and circuits, memory cards, hard disk drives, solid-state drives, non-volatile flash memory, or other data storage devices.

The brewer control system 101 may further include the user interface 108 to receive user input and/or provide status information concerning operations of the brewer device 100. In some embodiments, the brewer device 100 could include an input device, such as a button, switch, touchscreen, etc., from which the user could initiate certain operations or otherwise interact with the brewer device 100. For example, the brewer device 100 could include a touch screen that could be used to enter names of servers for the freshness monitor or otherwise initiating brewing operations. The user interface 108 could include an output device for updating the user regarding freshness status of the servers associated with the brewer device 100, such as status LED lights, a speaker to output verbal status, beeps or other audible output, a screen or other visual, audio, and/or haptic output.

The brewer device 100 includes a power source 114 to supply electrical power to the electrical components of the brewer device 100. Depending on the circumstances, the brewer device 100 could be configured to be plugged into an A/C power outlet, and/or include an internal battery that could be charged for supplying power to the brewer device 100.

Figure 2:
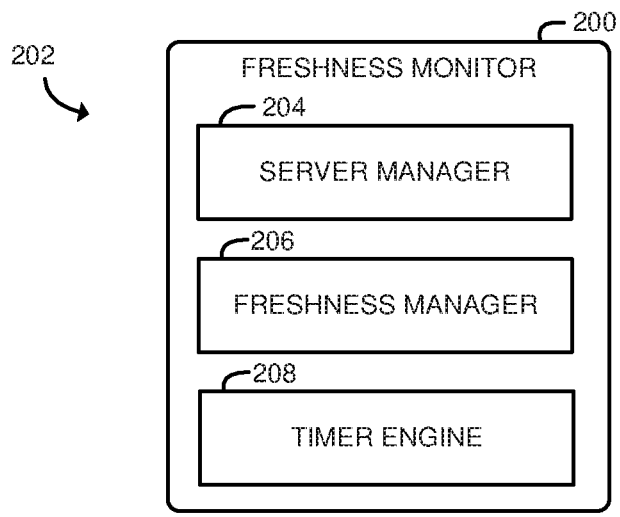
FIG. 2 is a simplified block diagram of various environments of a brewer controller for the brewer device of FIG. 1.

Referring now to FIG. 2, in an illustrative embodiment, a freshness monitor 200 establishes an environment 202 during operation to identify relative freshness of servers into which the brewer device 100 has produced a brewed beverage. The illustrative environment 202 includes a server manager 204, a freshness manager 206, and a timer engine 208. As shown, the various components of the environment 202 may be embodied as hardware, firmware, software, or a combination thereof. As such, in some embodiments, one or more of the components of the environment 202 may be embodied as circuitry or collection of electrical devices (e.g., server manager circuitry, a freshness manager circuitry, and a timer engine circuitry). It should be appreciated that, in such embodiments, one or more of the server manager 204, the freshness manager 206, and/or the timer engine 208 may form a portion of the processor 104, the I/O subsystem 106, and/or other components of the brewer control system 101. Additionally, in some embodiments, one or more of the illustrative components may form a portion of another component and/or one or more of the illustrative components may be independent of one another. The server manager 204 is configured to add servers to the freshness monitor 200 and store server names into the data storage device 112. For example, if the freshness feature is active, the server manager 204 could prompt the user to input a name for the server into which the brewed beverage is to be dispensed. By way of example, in embodiments in which the user interface 108 is a touchscreen, the server manager 204 could prompt the user to input a custom server name via the user interface 108, and/or select from a preexisting list of server names displayed on the user interface 108, such as "dark roast," "decaf," "light roast," "hazelnut," etc. In some cases, for example, the server list presented on the user interface could correspond with labels affixed to the servers; however, the server manager 204 is designed to be flexible on how the site/staff label the servers. They may use a grease pencil, predetermined flavor label, wrap or flavor indicator that corresponds to a server name entered via the user interface 108. In some cases, the server names used by the server manager 204 could correspond with physical characteristics of the servers. For example, a decaf label on the user interface 108 could correspond with a server having an orange portion, which could indicate decaf coffee. If the label on the server does not match any on the preexisting list, the user could type in a custom name into the brewer device 100 using the user interface 108. The server name could be any identifier, including but not limited to a name, number, alphanumeric combination, shape, color or other identifier. Upon entering or selecting a server name, the server manager 204 could then store the name into the data storage device 112 and/or memory 110.

Figure 3:
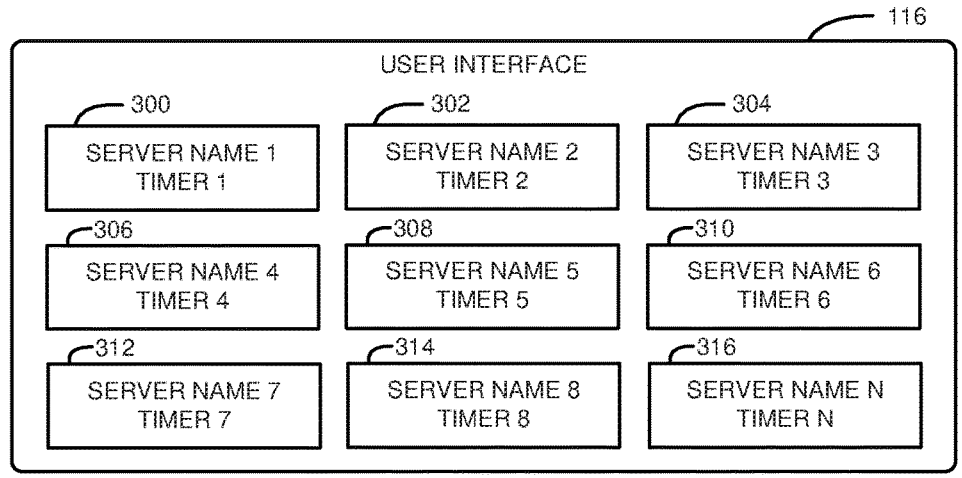
FIG. 3 is a simplified block diagram of at least one embodiment of a user interface for the brewer device of FIG. 1.

The freshness manager 206 is configured to initiate a timer for each server identified by the server manager 204 and provide an alert on the user interface 108 that identifies a server when the elapsed time for that server has passed a predetermined time amount. In some cases, the freshness manager 206 could be configured to display the elapsed time for one or more of the servers for which timers are being monitored. FIG. 3 shows an illustrative interface that could be generated by the freshness manager 206 on the user interface 108. In the example shown, the freshness manager 206 could display a plurality of timers 300, 302, 304, 306, 308, 310, 312, 314, 316 on the user interface 108. As shown, the freshness manager 206 could display both the server name and elapsed time for each server in some embodiments. In some cases, the particular servers that are displayed by the freshness manager could be user-selected. In other embodiments, depending on the circumstances, the freshness manager 206 could be configured to display server names with timers that are closest to expiring. Depending on the circumstances, the timers could be annotated or spatially arranged in some way based on the elapsed timer. By way of example only, the timers could be color-coded based on the time remaining for each timer. For example, a server timer could start as green, then turn yellow when there is less than a certain time period left until the timer expires, and then turn red after the time period expires. In some cases, the timers could be arranged on the display based on the time remaining; this would allow the user to glance at the same portion of the user interface 108 to determine which server is going to expire next. For example, the timers could be sorted such that the top left of the user interface 108 displays the timer that is the soonest to expire, and the timer that will expire last could be in the bottom right of the user interface 108. There are a variety of ways in which the user interface could be annotated or arranged to allow users to see, at a glance, which servers need (or are about to need) a fresh brew.

Referring again to FIG. 2, the timer engine 208 is configured to keep track of the elapsed time for each of the servers being monitored and warn the freshness manager 206 when the timer of a server has expired. Depending on the circumstances, the timer engine 208 could be configured with a predetermined time period in which to set the timer. In some cases, the predetermined time period could be user-adjusted via the user interface 108. Depending on the circumstances, the time period for a server could be determined by the timer engine based on one or more brew parameters, such as batch size and/or recipe. For example, the batch size for a brew could increase or decrease a default time period in which a timer is set for a server.

Figure 4:
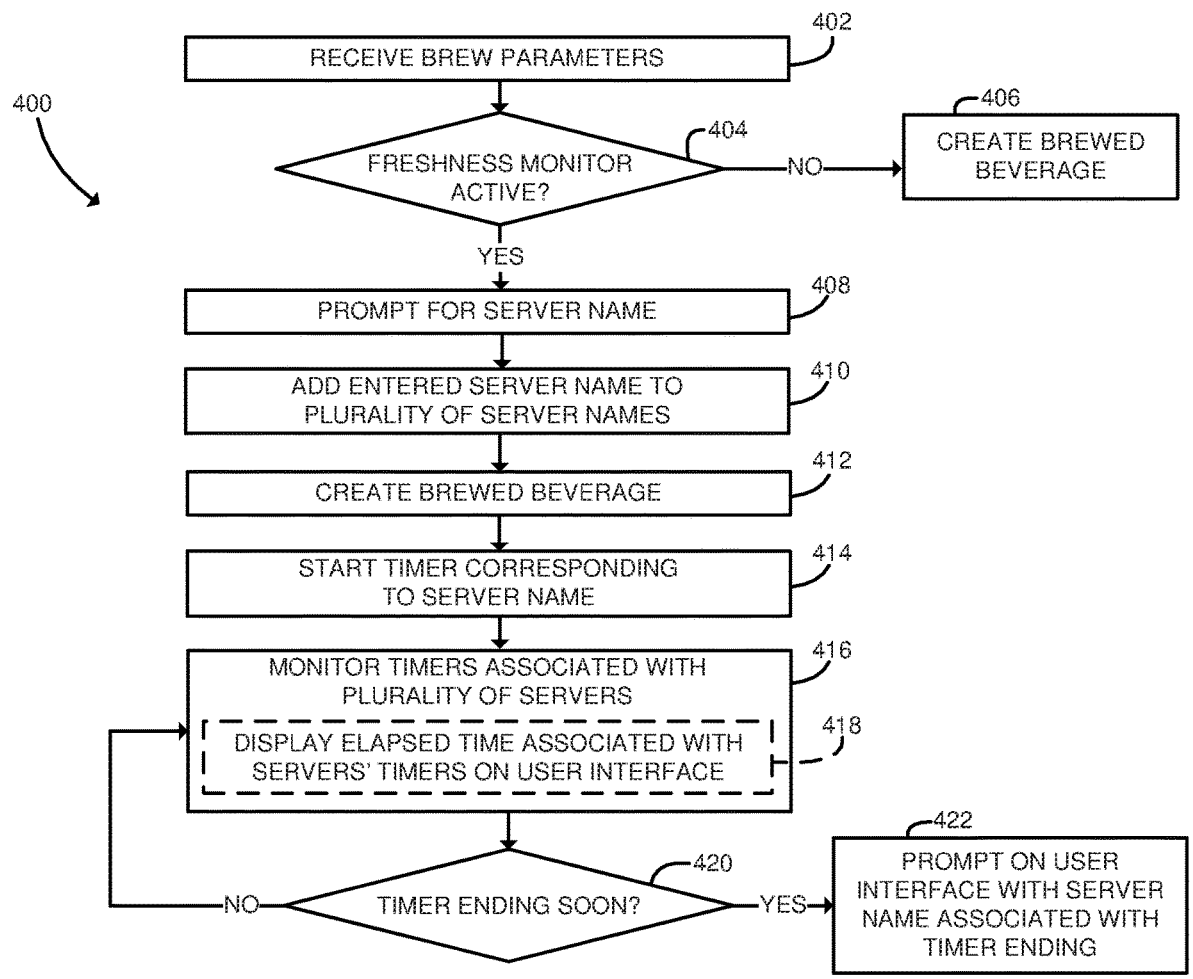
FIG. 4 is a simplified flow diagram of at least one embodiment of a method for monitoring freshness of a plurality of servers into which the brewer device of FIG. 1 has dispensed a brewed beverage.

Referring now to FIG. 4, in use, the brewer control system 101 may execute a method 400 for monitoring freshness of brewed beverages in a plurality of servers. The method 400 begins in block 402, in which the brewer device 100 receives the one or more brew parameters, such as batch size, recipe, and/or other parameters for the beverage to be brewed. The method advances to block 404 in which the brewer control system 101 determines whether the freshness monitor is active. If not (block 406), the brewer device 100 produces a brewed beverage in accordance with the brew parameters without monitoring for freshness. If the freshness monitor is active, the method advances to block 408 in which the user is prompted to enter a name for the server into which the brewed beverage is to be dispensed via the user interface 108. The server name entered through the user interface 108 is added in storage (block 410) to other server names previously entered and stored. The brewed beverage is then produced by the brewer device 100 (block 412) and the timer associated with the server starts (block 414). The brewer control system 101 monitors the timers associated with the servers (block 416). For example, in some cases, the elapsed time associated with the servers' timers could be displayed on the user interface 108 (block 418), similar to the example shown in FIG. 3. Depending on the circumstances, the elapsed time associated with the servers' timers could be configured similar to a screen saver for the brewer device 100, such that when the user is not operating the brewer, the elapsed time could automatically appear on the user interface 108 within a predetermined period after the user stops interacting with the user interface 108, such as thirty seconds. The method then advances to block 420 in which the system 101 determines whether one or more of the timers is expiring soon (or has just expired). If this is not the case, the system continues to monitor the timers (block 416). However, if one or more of the timers is ending soon (or just expired), the system 101 provides an alert on the user interface 108 that identifies the server that needs a fresh brew (block 422). By way of example only, the expired timer could start flashing and/or turn red. The user could then turn off or "snooze" the timer depending on the circumstances.

Figure 5:
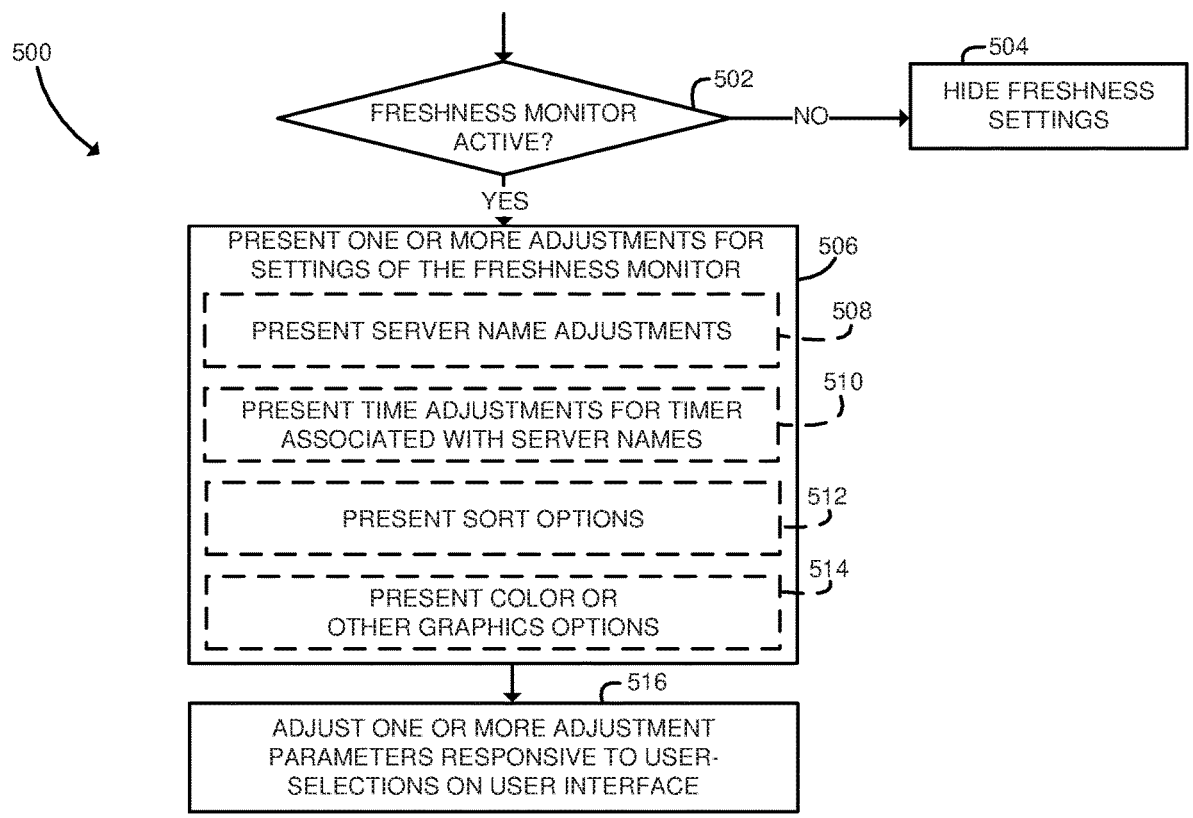
FIG. 5 is a simplified flow diagram of at least one embodiment of a method for establishing or setting various monitoring freshness parameters for the brewer device of FIG. 1.

Referring now to FIG. 5, in use, the brewer control system 101 may execute a method 500 for establishing and/or updating one or more parameters regarding timers. The method begins in block 502 in which the brewer control system 101 determines whether the freshness monitor is active. If not (block 504), the brewer device hides the portion for the user interface for adjusting settings of the freshness monitor. If the freshness monitor is active, the method advances to block 506 in which the user is presented with one or more adjustment parameters for the freshness monitor on the user interface 108, such as server names for predetermined list (block 508), times associated with each server name on the list (block 510), sort options (block 512), color or other graphic options (block 514), etc. Next, the method advances to block 516 in which the freshness monitor settings are adjusted based on the user selections on the user interface 108 and stored.

Identifying a server from a plurality of servers that need a fresh brew as described potentially offers multiple advantages. For example, this system could provide a lower cost alternative to freshness monitoring systems with communication devices in the brewer and servers. This system offers the ability to track freshness of the brewed beverage without the expense of wireless devices, such as RFID, Bluetooth or other costly electronics. Moreover, there is no distance limitation for the system as described because it does not rely on communications between the brewer device and servers.

EXAMPLES

Illustrative examples of the brewer device technologies disclosed herein are provided below. An embodiment of the technologies may include any one or more, and any combination of, the examples described below.

Example 1 is a brewer device with a brewer control system and a user interface. The brewer control system is configured to dispense a brewed beverage and includes a freshness monitor to generate a freshness status of respective brewed beverages dispensed by the brewer control system into a plurality of servers. The user interface includes an output device to present the freshness status of the respective brewed beverages in the plurality of servers. The freshness monitor is local to the brewer control system without establishing communications with any of the plurality of servers.

Example 2 includes the subject matter of Example 1, and wherein: the freshness status comprises a freshness timer indicating an approximate time until the brewed beverage in a respective server of the plurality of servers will no longer be fresh.

Example 3 includes the subject matter of Examples 1-2, and wherein: the brewer control system is configured to present the freshness timer for at least a portion of the plurality of servers indicating the approximate time until the brewed beverage in each respective server of the plurality of servers will no longer be fresh.

Example 4 includes the subject matter of Examples 1-3, and wherein: the freshness monitor generates an alert identifying a server of the plurality of servers in response to one or more of a threshold time remaining on the freshness timer associated with the server or the freshness timer associated with the server expiring.

Example 5 includes the subject matter of Examples 1-4, and wherein: the brewer control system is configured to change a color on the output device associated with the freshness status associated at least a portion of the plurality of servers as a function of a time remaining on the freshness timer associated with respective servers of the plurality of servers.

Example 6 includes the subject matter of Examples 1-5, and wherein: the freshness monitor determines an amount of time for the freshness timer associated with a server based on one or more of a batch size or a recipe of the brewed beverage dispensed into respective servers of the plurality of servers.

Example 7 includes the subject matter of Examples 1-6, and wherein: the output device presents the alert based on one or more of a graphical annotation of the freshness timer on the user interface, an audible sound, or haptic feedback.

Example 8 includes the subject matter of Examples 1-7, and wherein: the user interface is configured to present the freshness status on the output device by spatially arranging the freshness status based on an amount of time remaining of respective freshness timers associated with the plurality of servers.

Example 9 includes the subject matter of Examples 1-8, and wherein: the freshness monitor prompts for user selection of an identifier for one or more of the plurality of servers and the output device is configure to display the identifier.

Example 10 includes the subject matter of Examples 1-9, and wherein: the user interface is configured to present a freshness status with an identifier associated with respective servers of the plurality of servers on the output device.

Example 11 is a brewer device with a processor and a non-transitory, computer-readable storage media. The processor is configured to control brewing of a brewed beverage. The non-transitory, computer-readable storage media comprises a plurality of instructions stored thereon that, in response to being executed, cause the processor to: establish a freshness status associated with a plurality of brewed beverages; monitor the freshness status associated with the plurality of servers with brewed beverages; generate an alert identifying a server of the plurality of servers in response to a determination that a brewed beverage in the server is no longer fresh. The determination that the brewed beverage in the server is no longer fresh is made locally by the processor without establishing communications with any of the plurality of servers.

Example 12 includes the subject matter of Example 11, and wherein: the freshness status comprises a freshness timer indicating an approximate time until the brewed beverage in a respective server of the plurality of servers will no longer be fresh.

Example 13 includes the subject matter of Examples 11-12, and wherein: generating an alert comprises identifying a server of the plurality of servers in response to one or more of a threshold time remaining on the freshness timer associated with the server or the freshness timer associated with the server expiring.

Example 14 includes the subject matter of Examples 11-13, and further including determining an amount of time for a freshness timer for at least a portion of the plurality of servers based on one or more of a batch size or a recipe of the brewed beverage dispensed into respective servers of the plurality of servers.

Example 15 includes the subject matter of Examples 11-14, and further including presenting a freshness timer associated with each server of the plurality of servers on a display.

Example 16 includes the subject matter of Examples 11-15, and further including presenting the alert based on one or more of a graphical annotation of the elapsed time, an audible sound, or haptic feedback.

Example 17 includes the subject matter of Examples 11-16, and further including spatially arranging the freshness timer associated with each of the plurality of servers as a function of an amount of time remaining on respective freshness timers.

Example 18 is a brewer device including a server manager, a timer engine, and a freshness manager. The server manager, on the brewer device, is to receive and store a plurality of server names associated with the brewer device. The timer engine, on the brewer device, is to associate a timer for a predetermined time period with each server name of the plurality of server names. The timer engine starts the timer for a respective server name of the plurality of server names in response an input received on a user interface of the brewing device. The freshness manager, on the brewer device, is to provide an alert on the user interface upon the timer being less than a threshold time remaining. The alert identifies the server associated with the timer that is less than the threshold time remaining.

Example 19 includes the subject matter of Example 18, and wherein: the freshness status comprises a freshness timer indicating an approximate time until the brewed beverage in a respective server of the plurality of servers will no longer be fresh.

Example 20 includes the subject matter of Examples 18-19, and wherein: the freshness manager is to vary the alert on the user interface as to one or more of text, color, sound, or haptics as a function of an amount of time remaining on the freshness time in respective servers of the plurality of servers.

The invention claimed is:

1. A brewer device comprising:
a brewer control system configured to dispense a brewed beverage, wherein the brewer control system includes a freshness monitor to generate a freshness status of respective brewed beverages dispensed by the brewer control system into a plurality of servers, wherein the freshness monitor is configured to prompt for user-selection of an identifier from a plurality of pre-determined identifiers for at least a portion of the plurality of servers and store the user-selected identifiers corresponding with respective servers of the plurality of servers;
a user interface including an output device to present the freshness status of the respective brewed beverages in the plurality of servers, wherein the output device is configured to present the user-selected identifiers corresponding to respective servers of the plurality of servers in conjunction with respective freshness statuses for the plurality of servers; and
wherein the freshness monitor is local to the brewer control system without establishing communications with any of the plurality of servers.

2. The brewer device of claim 1, wherein the freshness status comprises a freshness timer indicating an approximate time until the brewed beverage in a respective server of the plurality of servers will no longer be fresh.

3. The brewer device of claim 2, wherein the brewer control system is configured to present the freshness timer for at least a portion of the plurality of servers indicating the approximate time until the brewed beverage in each respective server of the plurality of servers will no longer be fresh.

4. The brewer device of claim 3, wherein the freshness monitor generates an alert identifying a server of the plurality of servers in response to one or more of a threshold time remaining on the freshness timer associated with the server or the freshness timer associated with the server expiring.

5. The brewer device of claim 4, wherein the brewer control system is configured to change a color on the output device associated with the freshness status associated with at least a portion of the plurality of servers as a function of a time remaining on the freshness timer associated with respective servers of the plurality of servers.

6. The brewer device of claim 4, wherein the freshness monitor determines an amount of time for the freshness timer associated with a server based on a batch size of the brewed beverage dispensed into respective servers of the plurality of servers.

7. The brewer device of claim 4, wherein the output device presents the alert based on one or more of a graphical annotation of the freshness timer on the user interface, an audible sound, or haptic feedback.

8. The brewer device of claim 4, wherein the user interface is configured to present the freshness status on the output device by spatially arranging the freshness status based on an amount of time remaining of respective freshness timers associated with the plurality of servers.

9. The brewer device of claim 1, wherein the user interface is configured to present a freshness status with an identifier associated with respective servers of the plurality of servers on the output device.

10. A brewer device comprising:
a processor configured to control brewing of a brewed beverage;
a non-transitory, computer-readable storage media comprising a plurality of instructions stored thereon that, in response to being executed, cause the processor to:
prompt for user-selection of a server name from a plurality of pre-determined server names for at least a portion of a plurality of servers with brewed beverages;
store the plurality of user-selected server names associated with respective servers of the plurality of servers;
establish a freshness status associated with the plurality of servers with brewed beverages;
monitor the freshness status associated with the plurality of servers with brewed beverages;
generate an alert identifying a server of the plurality of servers by user-selected server name in response to a determination that a brewed beverage in the server is no longer fresh; and
wherein the determination that the brewed beverage in the server is no longer fresh is made locally by the processor without establishing communications with any of the plurality of servers.

11. The brewer device of claim 10, wherein the freshness status comprises a freshness timer indicating an approximate time until the brewed beverage in a respective server of the plurality of servers will no longer be fresh.

12. The brewer device of claim 11, wherein generating the alert comprises identifying a server of the plurality of servers in response to one or more of a threshold time remaining on the freshness timer associated with the server or the freshness timer associated with the server expiring.

13. The brewer device of claim 12, further comprising determining an amount of time for a freshness timer for at least a portion of the plurality of servers based on a batch size of the brewed beverage dispensed into respective servers of the plurality of servers.

14. The brewer device of claim 11, further comprising presenting a freshness timer associated with each server of the plurality of servers on a display.

15. The brewer device of claim 14, further comprising presenting the alert based on one or more of a graphical annotation of the freshness timer, an audible sound, or haptic feedback.

16. The brewer device of claim 14, further comprising spatially arranging the freshness timer associated with each of the plurality of servers as a function of an amount of time remaining on respective freshness timers.

17. A brewer device comprising:
a server manager, on the brewer device, to prompt for user-selection of a server name from a plurality of pre-determined server names for at least a portion of a plurality of servers, receive and store the user-selected server names associated with respective servers of the plurality of servers;
a timer engine, on the brewer device, to associate a timer for a predetermined time period with each server name of the plurality of server names, wherein the timer engine starts the timer for a respective server name of the plurality of server names in response to an input received on a user interface of the brewing device; and a freshness manager, on the brewer device, to present, on the user interface, the user-selected server names corresponding to respective servers of the plurality of servers in conjunction with respective timers for the plurality of servers and provide an alert on the user interface upon the timer being less than a threshold time remaining, wherein the alert identifies the server name associated with the timer that is less than the threshold time remaining.

18. The brewer device of claim 17, wherein the freshness status comprises a freshness timer indicating an approximate time until a respective server of the plurality of servers will no longer be fresh.

19. The brewer device of claim 18, wherein the freshness manager is to vary the alert on the user interface as to one or more of text, color, sound, or haptics as a function of an amount of time remaining on the freshness timer in respective servers of the plurality of servers.

20. The brewer device of claim 1, wherein the output device is configured to present the freshness statuses of respective brewed beverages in the plurality of servers after user-interaction with the user interface stops for a predetermined time period.

* * * * *